(No Model.)

W. T. S. DICKEY.
FRUIT PICKER.

No. 534,997.  Patented Mar. 5, 1895.

Witnesses
Harry L. Amer
J. F. Riley

Inventor
William T. S. Dickey.

By his Attorneys.
C. A. Snow & Co.

UNITED STATES PATENT OFFICE.

WILLIAM T. S. DICKEY, OF MINERAL BLUFF, GEORGIA.

FRUIT-PICKER.

SPECIFICATION forming part of Letters Patent No. 534,997, dated March 5, 1895.

Application filed March 19, 1894. Serial No. 504,261. (No model.)

*To all whom it may concern:*

Be it known that I, WILLIAM T. S. DICKEY, a citizen of the United States, residing at Mineral Bluff, in the county of Fannin and State of Georgia, have invented a new and useful Fruit-Picker, of which the following is a specification.

The invention relates to improvements in fruit pickers.

The object of the present invention is to improve the construction of fruit pickers, and to provide a simple and inexpensive one by which all kinds of fruit may be readily gathered without liability of bruising or otherwise injuring the same.

A further object of the invention is to provide a fruit picker which will be convenient to handle, and in which the knife will not injure the fruit by cutting the same, but will, in all instances, insure a perfect cutting of the stem.

The invention consists in the construction and novel combination and arrangement of parts hereinafter fully described, illustrated in the accompanying drawings, and pointed out in the claims hereto appended.

Figure 1:
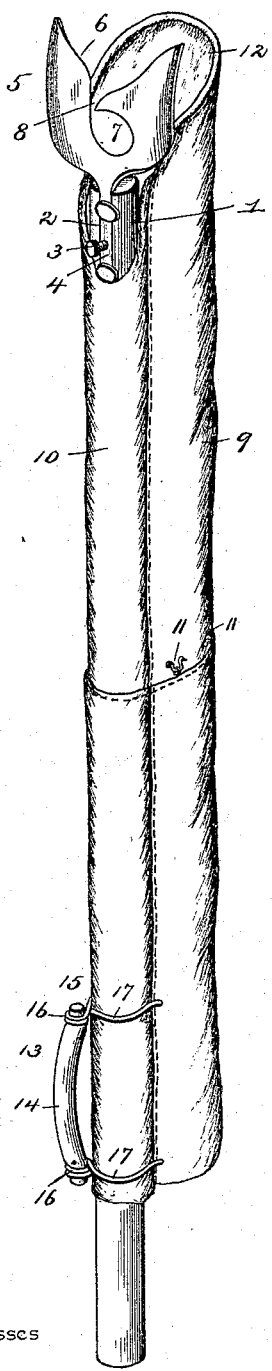
Figure 2:
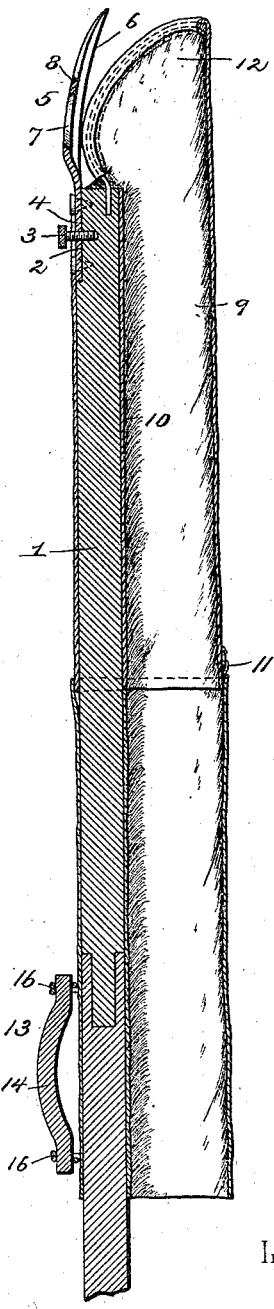
Figure 3:
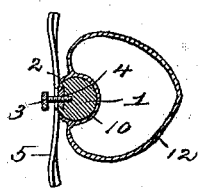
Figure 5:
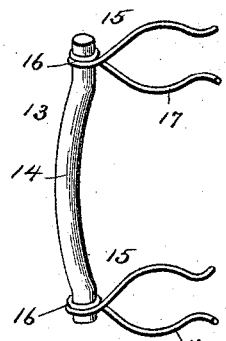
Figure 4:
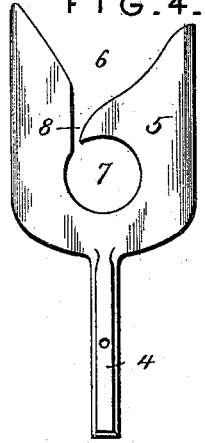

In the drawings: Figure 1 is a perspective view of a fruit picker constructed in accordance with this invention. Fig. 2 is a longitudinal sectional view of the same. Fig. 3 is a transverse sectional view. Fig. 4 is a detail plan view of the knife. Fig. 5 is a detail perspective view of the adjustable grip.

Like numerals of reference indicate like parts in all the figures of the drawings.

1 designates a rod, preferably composed of two or more separable sections, and provided at its upper end with a longitudinal dovetailed groove or way 2 in which is detachably secured, by a set-screw 3, a shank 4, of a knife 5. The knife consists of a single blade, which is slightly curved or concavo-convex. It is provided with a flaring mouth or entrance 6, formed by a substantially V-shaped recess, the edges of which are slightly curved; and the knife is provided, in rear of the flaring mouth, with a circular opening 7, communicating, at one side, with the mouth by a narrow slot 8. The slot 8 being located at one side of the opening 7 forms a transversely disposed cutting tongue 5ᵃ having front and rear cutting edges. The edges of the flaring mouth are slightly curved and their inner portions adjacent to the narrow slot 8 are sharpened to provide cutting edges at the upper face of the knife, and the circular opening 7 is provided with similar cutting edges. These cutting edges are formed by undercutting or beveling the lower face of the knife to prevent any liability of cutting the fruit.

In gathering fruit, the stem is introduced into the flaring mouth by an outward movement of the picker, and will generally be severed by the inner sharpened edges of the mouth; but if this does not effect a cutting of the stem, the latter will be readily severed, after entering the circular opening, by a pull of the knife toward the operator. This construction of knife insures a perfect cutting of the stems of fruit in every instance, and prevents any liability of the stem being pulled out of the fruit to the injury of the latter.

A conveyer chute 9 is secured, preferably by means of a casing 10, of the fabric, to the rod 1, but any other means of attachment may be provided. It is preferably constructed of two sections connected by hooks and eyes 11, but any other fastening device may be employed. The conveyer chute terminates adjacent to the lower end of the rod in order that the fruit may be readily delivered to the hand of the operator, thereby producing a convenient and easily-operated fruit gatherer. The upper end of the chute is spread by a substantially circular frame 12, which has the fabric of the chute attached to it by any suitable means, such as stitching or the like, and the ends of the metal forming the frame are inserted in suitable sockets of the rod.

To facilitate handling the fruit gatherer, an adjustable and detachable grip 13 is provided; and it consists of a curved handle 14, and resilient end-clips 15, embracing the rod. The end clips are provided with eyes 16 to receive the handle, and they are formed of curved arms 17, which securely clamp the rod and are readily detached therefrom. The outer ends of the curved arms of the resilient clamps are bent outward to enable them to be readily engaged with and detached from the rod without the ends of the metal catching into the fabric of the chute.

It will be seen that the fruit gatherer is simple and comparatively inexpensive in construction, that it is positive and reliable in operation, and that fruit may be readily picked in a convenient manner without liability of bruising, cutting, or otherwise injuring it.

Changes in the form, proportion, and the minor details of construction may be resorted to without departing from the principle or sacrificing any of the advantages of this invention.

What I claim is—

1. In a fruit gatherer, the combination of a rod provided at its top with a longitudinally disposed dovetail groove, a chute mounted on the rod and having its mouth arranged at the top of the rod, a knife provided with an oppositely beveled shank arranged in the dovetail groove and provided with a set screw for securing the knife to the rod, said knife being provided with a V-shaped mouth and having a circular opening in rear of the mouth, and provided with a transversely disposed point interposed between the opening and the mouth and provided with opposite cutting edges and forming a narrow slot at one side of the opening, and an adjustable handle mounted on the rod, substantially as described.

2. A fruit gatherer, having a pole and provided with an adjustable and detachable grip comprising a handle and clamps arranged at the ends of the handle and having eyes receiving the same and comprising resilient curved sides embracing the pole, substantially as described.

In testimony that I claim the foregoing as my own I have hereto affixed my signature in the presence of two witnesses.

WILLIAM T. S. DICKEY.

Witnesses:
  JOHN H. DAVIS,
  LEANDER T. LEATHERWOOD.